US010798733B2

(12) United States Patent
Bhattad et al.

(10) Patent No.: US 10,798,733 B2
(45) Date of Patent: Oct. 6, 2020

(54) LONG PUCCH DESIGN FOR SLOTS WITH VARYING DURATION OF UPLINK AND FOR DYNAMIC TIME DIVISION DUPLEXING

(71) Applicant: QUALCOMM Incorporated, San Diego, CA (US)

(72) Inventors: Kapil Bhattad, Bangalore (IN); Ananta Narayanan Thyagarajan, Bangalore (IN); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 16/276,249

(22) Filed: Feb. 14, 2019

(65) Prior Publication Data

US 2019/0254063 A1  Aug. 15, 2019

(30) Foreign Application Priority Data

Feb. 15, 2018  (IN) .............................. 201841005804

(51) Int. Cl.
*H04W 4/00* (2018.01)
*H04W 72/14* (2009.01)
(Continued)

(52) U.S. Cl.
CPC ............ *H04W 72/14* (2013.01); *H04L 1/007* (2013.01); *H04L 1/1607* (2013.01);
(Continued)

(58) Field of Classification Search
None
See application file for complete search history.

(56) References Cited

U.S. PATENT DOCUMENTS

2018/0124815 A1* 5/2018 Papasakellariou .... H04L 5/0053
2018/0359745 A1* 12/2018 Yeo ........................ H04W 72/14
(Continued)

FOREIGN PATENT DOCUMENTS

| EP | 3468280 A1 | 4/2019 |
| WO | 2017194673 A1 | 11/2017 |
| WO | 2018004246 A1 | 1/2018 |

OTHER PUBLICATIONS

International Search Report and Written Opinion—PCT/US2019/018262—ISA/EPO—dated May 17, 2019.
(Continued)

*Primary Examiner* — Elisabeth Benoit Magloire
(74) *Attorney, Agent, or Firm* — QUALCOMM Incorporated

(57) ABSTRACT

Techniques for dynamically controlling long physical uplink control channel (PUCCH) transmission are described. In an aspect, the disclosure describes a method for receiving a grant to transmit a long PUCCH, determining a grant type of the grant, wherein the grant type is one of a periodic grant or an aperiodic grant, determining a slot type of the slot to transmit the long PUCCH, and transmitting the long PUCCH over one or more slots based on the grant, the determined slot type, and the determined grant type. In another aspect, the disclosure describes a method for generating a triggering signal to transmit to a user equipment (UE), the triggering signal indicating to the UE to transmit a PUCCH, transmitting the triggering signal to the UE, and receiving the long PUCCH in response to the triggering signal.

30 Claims, 8 Drawing Sheets

(51) Int. Cl.
*H04W 72/04* (2009.01)
*H04W 72/12* (2009.01)
*H04L 1/16* (2006.01)
*H04L 5/00* (2006.01)
*H04L 5/14* (2006.01)
*H04L 1/00* (2006.01)

(52) U.S. Cl.
CPC .......... *H04L 5/0055* (2013.01); *H04L 5/0082* (2013.01); *H04L 5/0091* (2013.01); *H04L 5/14* (2013.01); *H04L 5/143* (2013.01); *H04L 5/1438* (2013.01); *H04L 5/1469* (2013.01); *H04W 72/0413* (2013.01); *H04W 72/0446* (2013.01); *H04W 72/1289* (2013.01); *H04L 5/001* (2013.01); *H04L 5/0023* (2013.01); *H04L 5/0048* (2013.01)

(56) References Cited

U.S. PATENT DOCUMENTS

| | | | | |
|---|---|---|---|---|
| 2019/0159191 | A1* | 5/2019 | Kim | H04W 72/14 |
| 2019/0335449 | A1* | 10/2019 | Xiong | H04L 1/1671 |
| 2019/0380125 | A1* | 12/2019 | Yamamoto | H04W 72/042 |
| 2020/0014517 | A1* | 1/2020 | Takeda | H04L 5/0053 |
| 2020/0045722 | A1* | 2/2020 | Bae | H04W 72/1284 |
| 2020/0059332 | A1* | 2/2020 | Takeda | H04L 5/0012 |
| 2020/0137747 | A1* | 4/2020 | Xu | H04W 80/08 |
| 2020/0137752 | A1* | 4/2020 | Parkvall | H04L 1/1819 |
| 2020/0154427 | A1* | 5/2020 | Choi | H04W 72/0413 |

OTHER PUBLICATIONS

Nokia et al: "On the Remaining Aspects of Group-common PDCCH in NR," 3GPP Draft; R1-1718603_Remaining_Aspects_of_Group_Common_PDCCH, 3rd Generation Partnership Project (3GPP), Mobile Competence Centre; 650, Route Des Lucioles; F-06921 Sophia-Antipolis Cedex; France, vol. RAN WG1, no. Prague, CZ; Oct. 9, 2017-Oct. 13, 2017, Oct. 8, 2017, XP051341777, 5 pages, Retrieved from the Internet: URL: http://www.3gpp.org/ftp/Meetings_3GPP_SYNC/RAN1/Docs/.

NTT Docomo, Inc., "Summary of [87-32]: UL L1/L2 Control Channel Design for NR", R1-1700618, 3GPP TSG RAN WG1 AH_NR Meeting, Spokane, USA, Jan. 16-20, 2017, 30 pages, http://www.3gpp.org/ftp/tsg_ran/WG1_RL1/TSGR1_AH/NR_AH_1701/Docs/.

* cited by examiner

LONG PUCCH DESIGN FOR SLOTS WITH VARYING DURATION OF UPLINK AND FOR DYNAMIC TIME DIVISION DUPLEXING

CROSS-REFERENCE TO RELATED APPLICATION(S)

This application claims the benefit of Indian Patent Application No. 201841005804, entitled "LONG PUCCH DESIGN FOR SLOTS WITH VARYING DURATION OF UPLINK AND FOR DYNAMIC TIME DIVISION DUPLEXING" and filed on Feb. 15, 2018, which is expressly incorporated by reference herein in its entirety.

BACKGROUND

Aspects of the present disclosure relate generally to wireless communication networks, and more particularly, to techniques for dynamically controlling long physical uplink control channel (PUCCH) transmissions in 5th Generation (5G) New Radio (NR) communications technology.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G NR wireless communications technology is envisaged to expand and support diverse usage scenarios and applications with respect to current mobile network generations. In an aspect, 5G NR communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in 5G NR communications technology and beyond may be desired.

For example, for 5G NR communications technology and beyond, current PUCCH solutions may not provide customization for PUCCH transmissions. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications by a user equipment (UE). The method may include receiving a grant to transmit a long physical uplink (UL) control channel (PUCCH). The method may also include determining a grant type of the grant, wherein the grant type is one of a periodic grant or an aperiodic grant. The method may further include determining a slot type of a time division duplexing (TDD) slot available to transmit the long PUCCH. The method may also include transmitting the long PUCCH over one or more TDD slots based on the grant, the determined slot type, and the determined grant type.

In some variations, the slot type of the slot may be one or more of a fixed UL slot, a flexible UL slot, or a flexible downlink (DL) slot. In some variations, the method may further include listening for a triggering signal, wherein the transmitting the long PUCCH over the one or more TDD slots is in response to receiving the triggering signal. In some variations, the triggering signal may be one of a slot format information (SFI) signal, a DL control information (DCI) signal, or a clear to send (CTS) signal from a base station.

In some variations, the method may include determining a format of the PUCCH, wherein transmitting the long PUCCH over one or more slots may be further based on the determining the format of the long PUCCH. In some variations, the method may include determining a number of UL symbols available on the one or more slots, wherein the determining the format of the long PUCCH may be based on the determining the number of UL symbols available on the one or more slots. In some variations, the method may include determining whether to listen for a DL CTS, wherein transmitting the long PUCCH over the one or more slots may be further based on the determining whether to listen for the DL CTS. In some variations, the method may include determining one or more PUCCH start symbols for the one or more slots and aggregating the one or more slots based on the determining the one or more PUCCH start symbols. In some variations, the one or more slots includes a TDD self-contained uplink-centric slot.

In another aspect, the present disclosure includes a method of wireless communications by a base station. The method may include generating a triggering signal to transmit to a UE, the triggering signal indicating to the UE to transmit a long PUCCH. The method may also include transmitting the triggering signal to the UE. The method may further include receiving the long PUCCH in response to the triggering signal.

In another aspect, a UE is disclosed. The UE may include a memory and a processor in communication with the memory. The processor may be configured to receive a grant to transmit a long PUCCH. The processor may also be configured to determine a grant type of the grant, wherein the grant type is one of a periodic grant or an aperiodic grant. The processor may further be configured to determine a slot type of a TDD slot available to transmit the long PUCCH. The processor may also be configured to transmit the long PUCCH over one or more TDD slots based on the grant, the determined slot type, and the determined grant type.

Moreover, the present disclosure also includes apparatus having components or configured to execute or means for executing the above-described methods, and computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
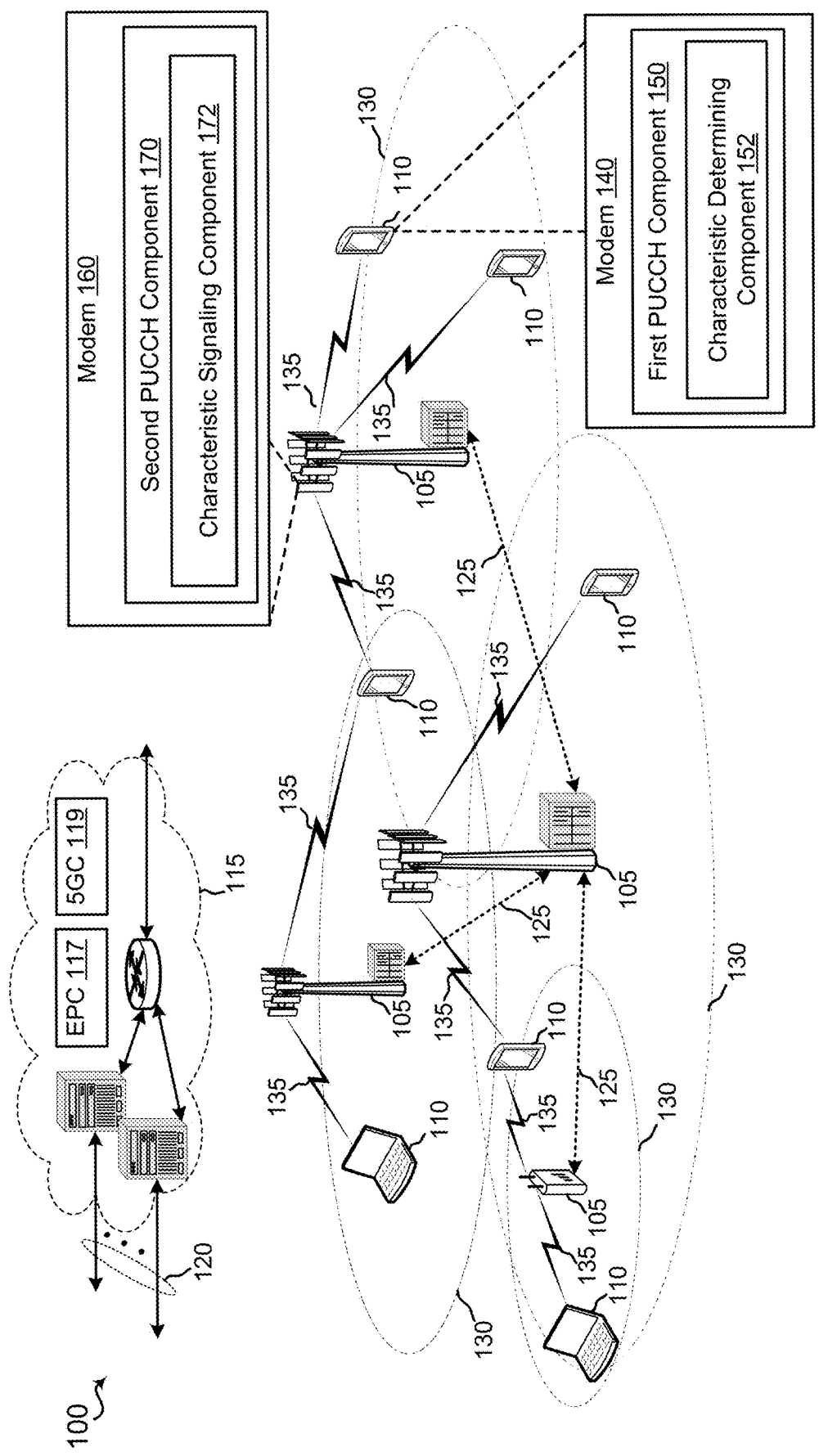
FIG. 1 is an example of a schematic diagram of a wireless communication network including at least one user equipment (UE) and at least one base station having a physical uplink (UL) control channel (PUCCH) component configured according to this disclosure for controlling PUCCH formats and transmission.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to techniques for dynamically controlling characteristics, such as type of slot, timing, and parameters, for long physical uplink (UL) control channel (PUCCH) transmissions in 5th Generation (5G) New Radio (NR) communications technology. The type of slot may refer to fixed and flexible slots. The type of slot may be dynamic in that the slot may be one or more of a fixed UL, fixed downlink (DL), flexible UL, or flexible DL. The timing may refer to the when PUCCH is transmitted. The timing may be dynamic in that the long PUCCH may be transmitted based on other characteristics, such as the type of slot, or based on a triggering signal, such as a clear to send (CTS), slot format information (SFI), and a DL control information signals. The parameters may refer to the number of symbols, start symbols, or patterns, such as demodulation reference signal (DMRS) patterns, of a long PUCCH. The parameters may be dynamic in that the parameters may be based on one or more of the other characteristics for a long PUCCH.

In general, a long PUCCH is used for transmitting a higher number of control bits than a short PUCCH. For example, a long PUCCH may transmit 10 bits or more for channel state information (CSI) while a short PUCCH may transmit 1 or 2 bits for an acknowledgment/negative-acknowledgment (ACK/NACK).

Since a long PUCCH requires more control bits, more orthogonal frequency-division multiple access (OFDMA) symbols (and more resource blocks (RBs)) are needed to carry a larger amount of content than a short PUCCH. In an example, a long PUCCH may use 4-14 symbols in a slot. The higher number of symbols required by the long PUCCH causes the longer PUCCH to be located in the middle of a slot (since the first few symbols are DL control symbols) during a UL data portion of the slot. Since the long PUCCH does not use all of the RBs (i.e., frequencies), the long PUCCH may coexist with the UL data. In an example, the long PUCCH and the UL data may use 20 RBs while the rest may be used by a physical UL scheduling channel (PUSCH).

Since a short PUCCH only uses 1 or 2 symbols, the short PUCCH is typically located at the end of the slot (e.g., last 1 or 2 symbols) during a UL control portion of the slot.

Additional features of the present aspects are described in more detail below with respect to FIGS. 1-8.

It should be noted that the techniques described herein may be used for various wireless communication networks such as code-division multiple access (CDMA), time-division multiple access (TDMA), frequency-division multiple access (FDMA), OFDMA, single-carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE and 5G NR) communications over a shared radio frequency spectrum band. The description below, however, describes an LTE/LTE-A or 5G NR system for purposes of example, and LTE and 5G NR terminology is used in much of the description below, although the techniques are applicable beyond LTE/LTE-A and 5G NR applications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a first PUCCH component 150 with a characteristic determining component 152 that is configured to perform various aspects described herein for PUCCH transmission in accordance with dynamic characteristics. Wireless communication network 100 includes at least one base station 105 with a modem 160 having a PUCCH component 170 with a characteristic signaling component 172 that is configured to perform various aspects described herein for signaling dynamic characteristics to a UE 110 for one or more PUCCH transmissions. Thus, according to the present disclosure, various techniques for controlling characteristics for PUCCH transmission in communications technology are described.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The core network 115 may include an Evolved Packet Core (EPC) 117 and/or a 5G Core (5GC) 119. The base stations 105 configured for 4G LTE (collectively referred to as Evolved Universal Mobile Telecommunications System (UMTS) Terrestrial Radio Access Network (E-UTRAN)) may interface with the EPC 117 through backhaul links 120 (e.g., S1 interface), which may be wired or wireless communication links. The base stations 102 configured for 5G NR (collectively referred to as Next Generation RAN (NG-RAN)) may interface with the 5GC 119 through backhaul links 120.

The EPC 117 may include one or more Mobility Management Entitys (MMEs), a Serving Gateway, a Multimedia Broadcast Multicast Service (MBMS) Gateway, a Broadcast Multicast Service Center (BM-SC), and/or a Packet Data Network (PDN) Gateway. The MME may be in communication with a Home Subscriber Server (HSS). The MME may be a control node that processes the signaling between the UEs 110 and the EPC 117. Generally, the MME may provide bearer and connection management. All user Internet protocol (IP) packets may be transferred through the Serving Gateway, which itself may be connected to the PDN Gateway. The PDN Gateway may provide UE IP address allocation as well as other functions. The PDN Gateway and the BM-SC may be connected to the IP Services. The IP Services may include the Internet, an intranet, an IP Multimedia Subsystem (IMS), a PS Streaming Service, and/or other IP services. The BM-SC may provide functions for MBMS user service provisioning and delivery. The BM-SC may serve as an entry point for content provider MBMS transmission, may be used to authorize and initiate MBMS Bearer Services within a public land mobile network (PLMN), and may be used to schedule MBMS transmissions. The MBMS Gateway may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 119 may include one or more Access and Mobility Management Functions (AMFs), a Session Management Function (SMF), and/or a User Plane Function (UPF). The AMF may be in communication with a Unified Data Management (UDM). The AMF may be a control node that processes the signaling between the UEs 105 and the 5GC 119. Generally, the AMF may provide QoS flow and session management. All user Internet protocol (IP) packets may be transferred through the UPF. The UPF may provide UE IP address allocation as well as other functions. The UPF may be connected to the IP Services. The IP Services may include the Internet, an intranet, an IP Multimedia Subsystem (IMS), a PS Streaming Service, and/or other IP services.

The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, the base station 105 may be referred to as a base transceiver station, a radio base station, an access point, an access node, a radio transceiver, a NodeB, an evolved NodeB (eNodeB or eNB), a generation NodeB (gNB), a Home NodeB, a Home eNodeB, a relay, or some other suitable terminology. The geographic coverage area 130 for the base station 105 may be divided into sectors or cells making up only a portion of the coverage area (not shown). The wireless communication network 100 may include the base stations 105 of different types (e.g., macro base stations or small cell base stations, described below). Additionally, the plurality of base stations 105 may operate according to different ones of a plurality of communication technologies (e.g., 5G NR, fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a 5G NR technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term eNB may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. The small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), medium access control (MAC), etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, a radio resource control (RRC) protocol layer may provide establishment, configuration, and maintenance of an RRC connection between the UE 110 and the base stations 105. The RRC protocol layer may also be used for the core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. The UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, the UE 110 may be Internet of Things (IoT) and/or machine-to-machine (M2M) type of device, e.g., a low power, low data rate (relative to a wireless phone, for example) type of device, that may, in some aspects, communicate infrequently with wireless communication network 100 or other UEs. The UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more of the base stations 105. The wireless communication links 135 shown in the wireless communication network 100 may carry UL transmissions from the UE 110 to the base station 105, or DL transmissions from the base station 105 to the UE 110. The DL transmissions may also be called forward link transmissions while the UL transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using FDD operation (e.g., using paired spectrum resources) or time division duplexing (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, the base stations 105, or the UEs 110 may include multiple antennas for employing antenna diversity schemes to improve communication quality and reliability between the base stations 105 and the UEs 110. Additionally or alternatively, the base stations 105 or the UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple DL CCs and one or more UL CCs for CA. CA may be used with both FDD and TDD CCs. The base stations 105 and UEs 110 may use spectrum up to Y MHz (e.g., Y=5, 10, 15, or 20 MHz) bandwidth per carrier allocated in a CA of up to a total of Yx MHz (x=number of CCs) used for transmission in each direction. The carriers may or may not be adjacent to each other. Allocation of carriers may be asymmetric with respect to DL and UL (e.g., more or less carriers may be allocated for DL than for UL). The CCs may include a primary CC and one or more secondary CCs. A primary CC may be referred to as a primary cell (PCell) and a secondary CC may be referred to as a secondary cell (SCell).

The wireless communications network 100 may further include the base stations 105 operating according to wireless local area network (WLAN) or Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of the base stations 105 and/or the UEs 110 may operate according to a 5G NR technology referred to as millimeter wave (mmW or mmwave) technology. For example, mmW technology includes transmissions in mmW frequencies and/or near mmW frequencies.

Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a mmW. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, the base stations 105 and/or the UEs 110 operating according to the mmW technology may utilize beamforming in their transmissions to compensate for the extremely high path loss and short range.

Figure 2:
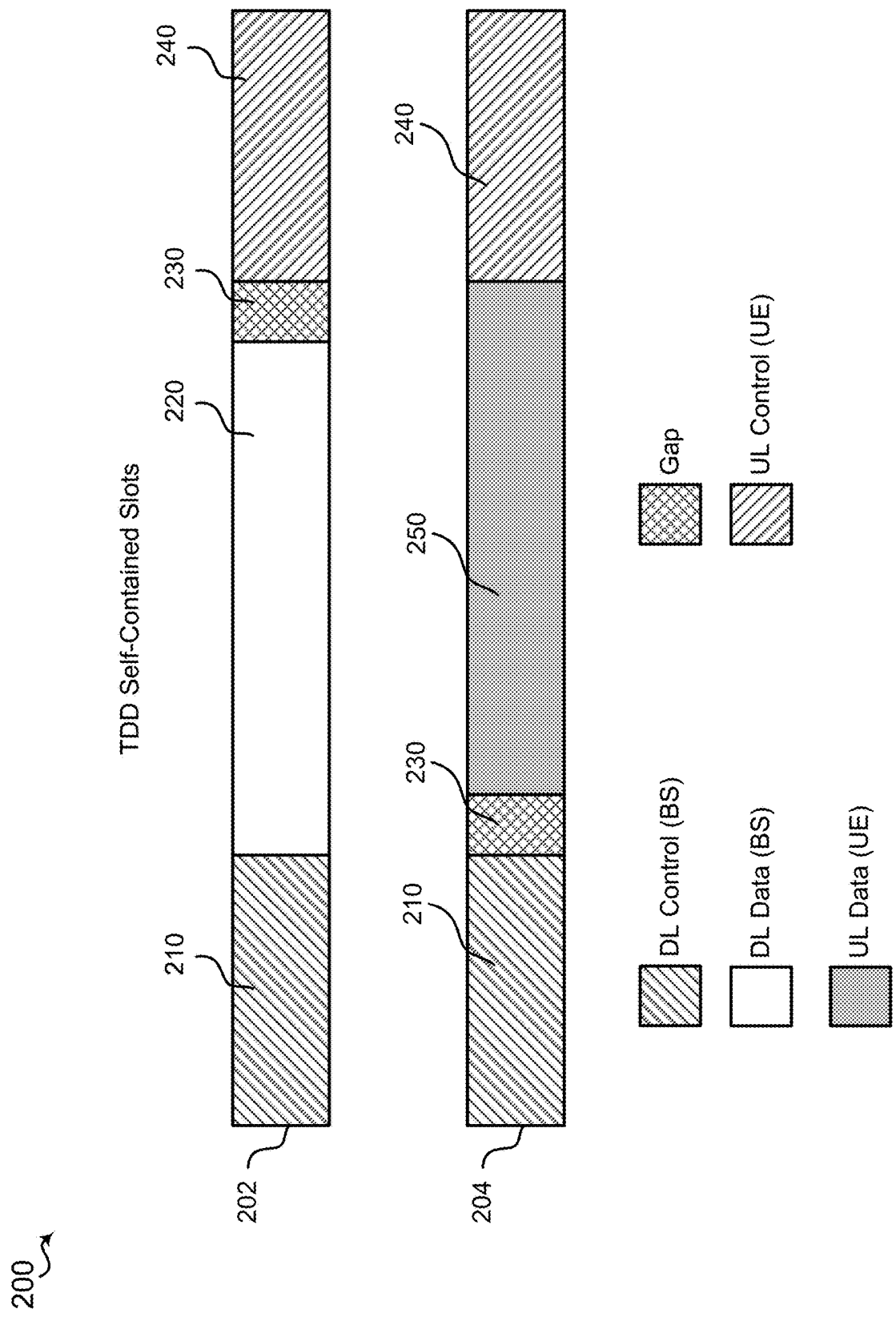
FIG. 2 is an example of fixed time division duplexing (TDD) slots.
Figure 3:
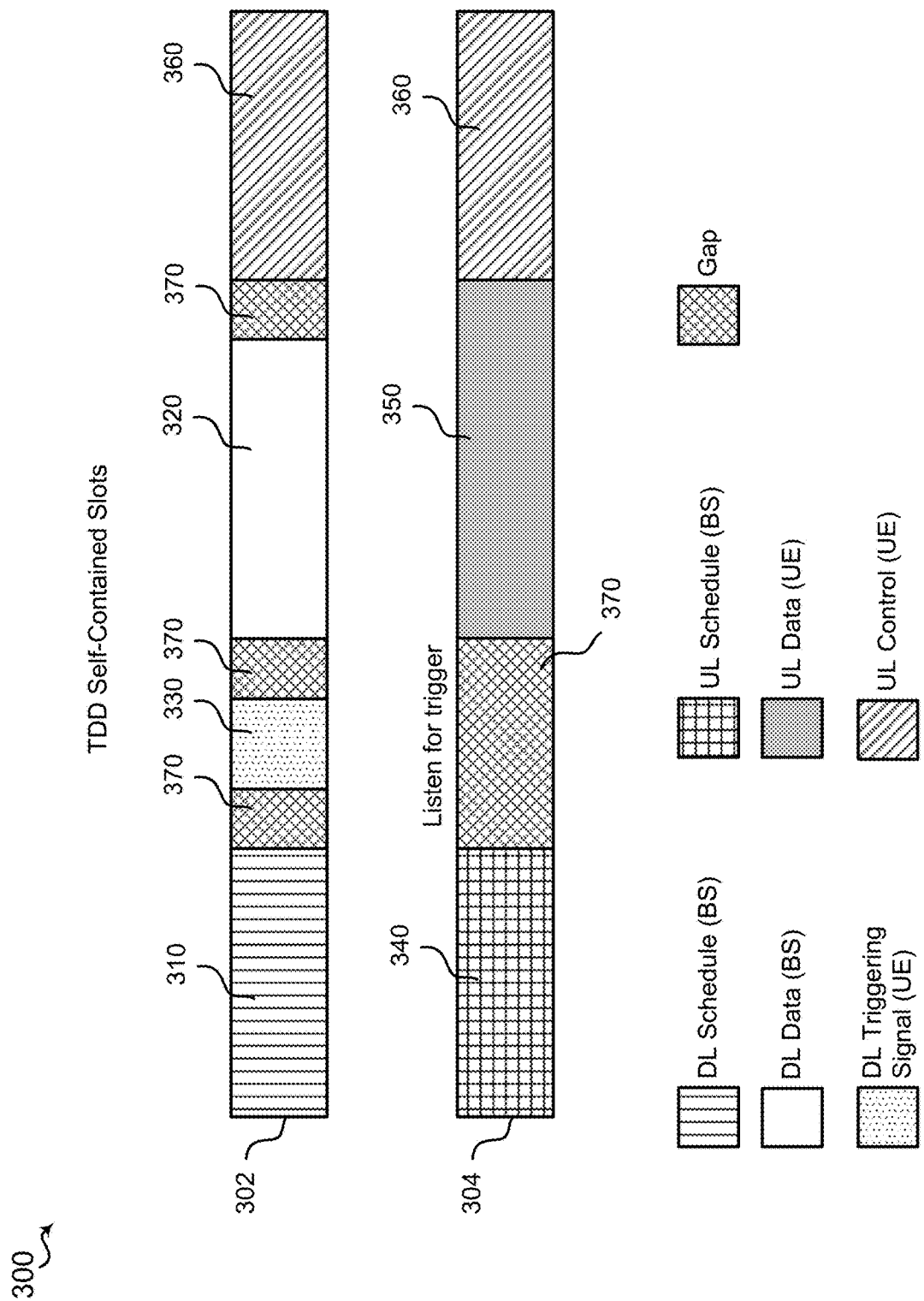
FIG. 3 is an example of flexible downlink TDD slots.
Figure 4:
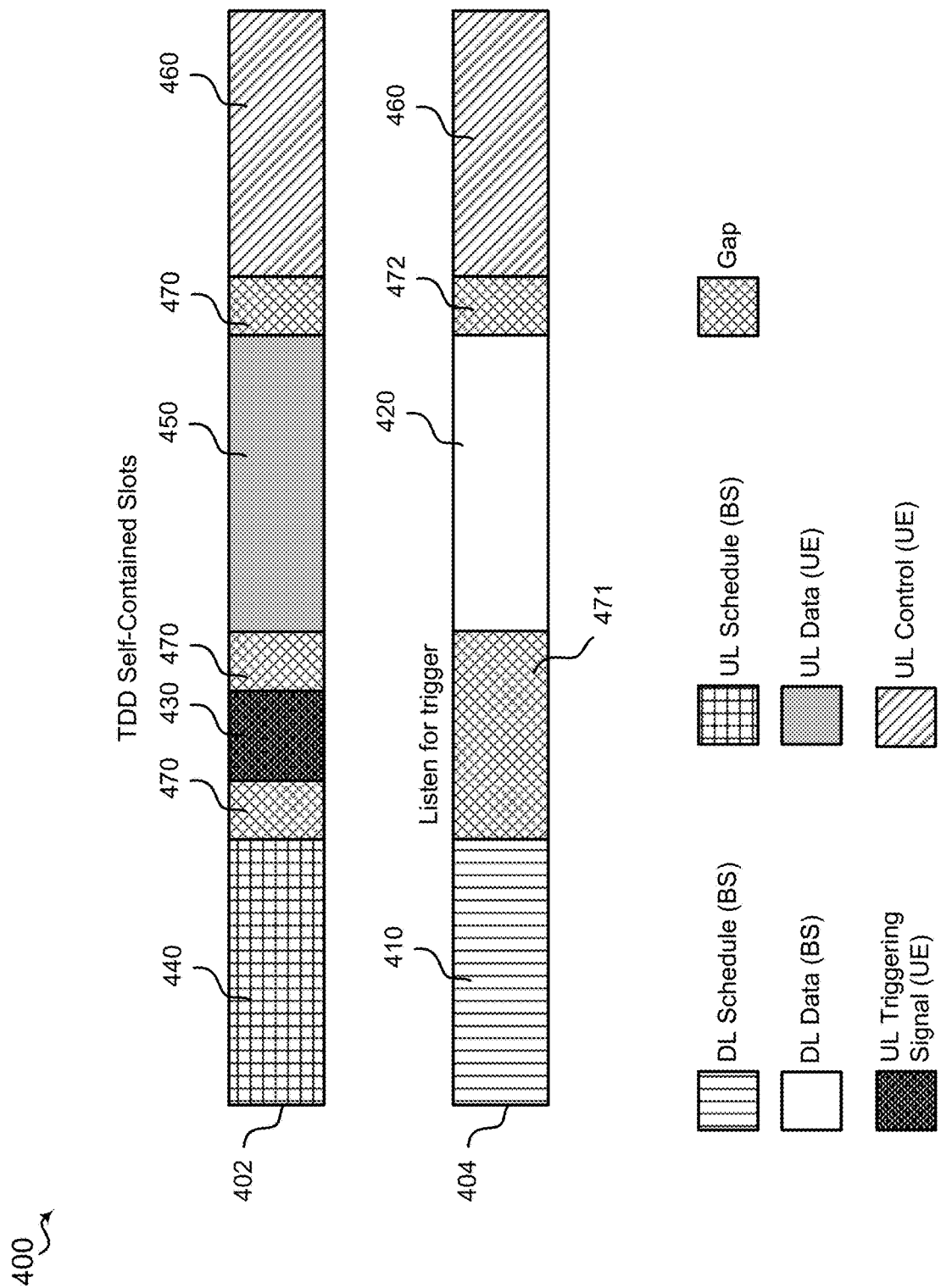
FIG. 4 is an example of flexible uplink TDD slots.

FIGS. 2-4 illustrate different configurations of dynamic TDD slots. Dynamic TDD slots may include four types of slots: a fixed DL slot, a fixed UL slot, a flexible DL slot, and a flexible UL slot. As described in more detail below, a fixed DL slot is unable to include a long PUCCH. However, a fixed UL slot, a flexible UL slot, and a flexible DL slot (once converted to a UL slot) may include long PUCCHs.

Referring to FIG. 2, there are shown structures 200 illustrating examples of fixed TDD slots. The TDD slots may be self-contained slots which refers to a slot structure in which a grant is received and a transmission takes place in response to the grant, all within the same slot structure. The first structure 202 is an example of a DL centric fixed slot and may include a DL control region 210 (e.g., UL/DL grant), a DL data region 220, a gap 230, and a UL control region 240 (e.g., short PUCCH). The second structure 204 is an example of a UL centric fixed slot and may include a DL control region 210, one or more gaps 230, a UL data region 250, and a UL control region 240. For each of the structures 202, 204, the DL control region 210 may be within the first few symbols, and the UL control region 240 may be within the last few symbols. The DL control region 210 and the UL control region 240 may be fixed to ensure reliable control of transmissions. The first structure 202 is a fixed DL centric slot and therefore unable to be converted to include UL data. This means that a long PUCCH is not able to transmitted on the first structure 202. However, the second structure 204, which includes UL data region 250 may include a long PUCCH.

In FIGS. 3 and 4, there are shown structures 300, 400 illustrating examples of DL/UL TDD slots which may be dynamically switched by triggering signals. As shown, switching from a UL slot to a DL slot, or vice versa, may be caused by a triggering signal. Examples of the triggering signal may include a clear to send (CTS) signal, a DL control information (DCI) signal, a slot format information (SFI) signal, or any other signal that initiates dynamic switching for slots. In some examples, the triggering signal may be transmitted in a UL/DL grant. In some examples, the triggering signal may be transmitted by the base station 105 to the UE 110, or vice versa.

Referring to FIG. 3, the third structure 302 may be an example of a DL centric slot that remains as a DL slot. In an example, the third structure 302 may include a DL schedule region 310, one or more gaps 370, a DL triggering signal 330 (e.g., CTS, DCI, or SFI), a DL data region 320, and a UL control region 360 (e.g., short PUCCH). In an example, the DL schedule region 310 may include a grant which indicates to the UE 110 to listen for the triggering signal 330. In an example, the UE 110 may transmit the triggering signal 330 (e.g., CTS, DCI, or SFI) when the UE 110 is receiving DL data.

The fourth structure 304 may be an example of a DL centric slot that converts to a UL slot. In an example, the fourth structure 304 may include a UL schedule region 340, a gap 370, a UL data region 350, and a UL control region 360 (e.g., short PUCCH). In this example, the UE 110 may desire to transmit UL data and therefore listen for the triggering signal during the gap 370. The gap 370 in the fourth structure 304 may be larger than the gap 370 in third structure 302 to allow sufficient time to listen for a triggering signal. If the UE 110 receives the triggering signal, a DL data region (e.g., DL data region 320) is converted to the UL data region 350. Otherwise, the DL data region remains a DL data region.

Referring to FIG. 4, the fifth structure 402 may be an example of a UL centric slot remaining as a UL slot. In an example, the fifth structure 402 may include a UL schedule region 440, one or more gaps 470, a UL triggering signal 430 (e.g., CTS, DCI, or SFI), a UL data region 450, and a UL control region 460 (e.g., short PUCCH). In an example, the UL schedule region 440 may include a grant indicating to the UE 110 to listen for the UL triggering signal 430. The UE 110 may receive the triggering signal 430 (e.g., CTS, DCI, or SFI) from the base station 105. In an example, the UL triggering signal 430 may be received by the UE 110 before transmitting UL data.

The sixth structure 404 may be an example of a UL centric slot that converts to a DL slot. In an example, the sixth structure 404 may include a DL schedule region 410, a first gap 471, a DL data region 420, a second gap 472, and a UL control region 360 (e.g., short PUCCH). In this example, the base station 105 may desire to transmit DL data and therefore listens for the triggering signal during the first gap 471. The first gap 471 in the sixth structure 404 may be larger than the gap 470 in fifth structure 402 to allow sufficient time to listen for a triggering signal. If the base station 105 does not receive the triggering signal from a neighboring base station, a UL data region (e.g. UL data 450) is converted to the DL data region 420. Otherwise, the UL data region remains a UL data region.

Typically, a long PUCCH is included in the data portion of a UL slot and is not just in the last few symbols. Use of the data portion allows the long PUCCH to use a greater number of control bits as compared to a short PUCCH. For a fixed UL slot (e.g., structure 202) the long PUCCH may allow the use of a greater number of symbols than a flexible slot (e.g., structures 304, 402). For example, in the structure 202, a long PUCCH may be allowed to use 12 or more symbols whereas in the structure 402, a long PUCCH may be allowed to use less than 10 symbols. The structure 202 allows a greater number of symbols for a long PUCCH because the structure 202 does not include triggering signals or as many gaps that the structure 402 requires.

In dynamic TDD slot scenarios, special handling is needed to determine whether the long PUCCH should be transmitted or not. A UE (e.g., UE 110) may receive two types of grants from a base station (e.g., 105) to transmit a long PUCCH: a periodic grant or an aperiodic grant. A periodic grant may include a semi-static grant given to the UE by an upper protocol layer configuration (e.g., RRC layer configuration). For example, an RRC layer may generate the period grant over a predetermined period of time, and configure the UE to transmit a PUCCH once every few slots. An aperiodic grant may include a grant received through a DCI in the current or a previous slot. The aperiodic grant may configure the UE to transmit the PUCCH at a predetermined time.

For periodic grants, a long PUCCH transmission may be limited to specific slot types in the granted slots. The maximum number of symbols available for the long PUCCH in a slot may be determined based on the type of slots. In a first example, the long PUCCH may be limited to fixed UL slots only, which would limit the potential number of symbols available to those available to the fixed UL slot (e.g., 13 or more symbols). In a second example, the long PUCCH may be limited to fixed UL slots and flexible UL slots (e.g., less than 13 symbols). In a third example, the long PUCCH may be limited to fixed UL slots, flexible UL slots, and flexible DL slots (e.g., less than 13 symbols).

In an aspect, for periodic transmissions, a long PUCCH may be transmitted based on the availability of a fixed UL or flexible slot. As a first example, a long PUCCH may always be transmitted when the granted slot is a fixed UL or flexible slot. In other words, in this configuration, the UE 110 may always transmit an available long PUCCH, without listening for a triggering signal, on a granted fixed UL or flexible slot. In this configuration, any slot allocated or granted for long PUCCH may be deemed a "fixed UL" to the UE 110.

In a second example, for periodic transmissions, a long PUCCH may be transmitted in a granted flexible UL/DL slot based on a triggering signal that indicates that the long PUCCH may be transmitted. For example, the triggering signal may give an explicit indication that the long PUCCH is allowed to be transmitted on the UL slot. In another example, the triggering signal may be located in the UL slot or may be located prior to the UL slot to indicate an explicit allowance to transmit the long PUCCH. Alternatively, a DL grant may explicitly indicate that the slot is a DL slot and hence prevent the transmission of the long PUCCH.

In an example, the above options and configurations may be selected based on an upper protocol layer configuration (e.g., RRC layer configuration) or based on the type of PUCCH data (e.g., channel quality indicator (CQI) vs ACK/NACK bits) available to transmit.

In aperiodic transmissions, a grant may be received through a triggering signal (e.g., CTS, DCI, or SFI) in the current slot or a previous slot. For aperiodic transmissions a long PUCCH may be transmitted based on two options. In the first option, if the UE 110 is granted to transmit the long PUCCH, the UE 110 may transmit without waiting for a triggering signal. In the second option, after the UE 110 is granted to transmit the long PUCCH, the UE 110 waits for a triggering signal to transmit. In the second option, the triggering signal may only be necessary based on specific types of slots such as flexible slots.

In some aspects, parameters for a long PUCCH may be based on the type of slot or other available characteristics. For example, start symbols, number of symbols, DMRS patterns, or other parameters may be based on the type of slot used to transmit the PUCCH. In an example, fixed UL slots (e.g., structure 204) may always have one length (e.g., 13 or more symbols) while flexible UL slots (e.g., structure 304, 402) with CTS related gaps may have a different length (e.g., less than 8 symbols) as they have to have some symbols reserved for CTS, and flexible UL slots without CTS related gaps may have yet another length (e.g., less than 13 symbols).

The lengths for the different slot types may be configured by one or more higher level layers, such as the RRC layer, such that once the UE 110 determines a type of slot (e.g., fixed or flexible), the UE 110 may determine the parameters of the long PUCCH. In an example, the UE 110 may determine the type of slot based on a received triggering signal or another type of signal. In another example, the UE 110 may determine the type of slot based on the location of a received trigger. For example, the UE 110 may determine the type of slot based on a common DCI signal being located in the current slot or a previous slot to indicate the type of slot available for transmitting the long PUCCH and also the parameters of the PUCCH.

In another example, the DCI signal may provide information to the UE 110 to determine the PUCCH parameters. For example, if the DCI signal indicates the flexible UL slot includes a CTS signal, the UE 110 can use one start symbol and a number of symbols, else use another start symbol and a number of symbols for transmitting the long PUCCH.

In another example, for aperiodic PUCCH, an ACK/NACK resource information (ARI) field in a grant may be used (with expanded bitwidth if needed) to indicate the PUCCH parameters instead of a common DCI signal.

In an aspect, since the PUCCH on different slots may have different number of symbols, the UE 110 may be allowed to use a higher power on slots with a lower number of symbols. The power allowed may be a function of the number of symbols. For example, a total power in a slot may be inversely proportional to the number of symbols in the slot.

The PUCCH power control parameter can also be a function of slot type, as shown below.

$$P_{PUCCH,c} = \min \begin{cases} P_{CMAX,c}^{(i)} \\ P_{0\_PUCCH} + PL_c(K) + 10\log_{10}(M_{PUCCH,c}^{(i)}) + \\ \Delta_{F\_PUCCH}^{(F)} + \Delta_{PUCCH_{TF},c}^{(i)} + g(i) \end{cases} \quad \text{Equation 1}$$

where $P_{PUCCH,c}$ is in dBm. For different slot types, $P_{0\_PUCCH}$ could be configured to be different to handle fixed UL interference, potential DL interference on the flexible UL slots, and potential UL interference to other DL receiver on the flexible DL slots.

In an aspect, the UE 110 may determine when to transmit a DL CTS signal or whether to listen to a DL CTS signal to avoid UE-to-UE interference. In a first example, the UE 110 desiring to transmit a PUCCH, may be required to listen for a CTS signal and not transmit the PUCCH if the CTS signal is received. In a second example, the UE 110 may not be required to listen for a CTS signal but instead may be required to limit a length of the PUCCH as compared to those PUCCHs where the UE 110 listens for the CTS signal. In an example, before transmitting the PUCCH, the UE 110 may be required to listen for the CTS signal and to also determine whether a serving cell is UL or DL.

Selection by the UE 110 between the first example (where the UE 110 may be required to listen for a CTS signal) and the second example (where the UE 110 may not be required to listen for a CTS signal), may be controlled through an upper protocol layer configuration (e.g., RRC layer configuration) and/or the PUCCH triggering signal (e.g., DCI). Selection between the first and second examples, may be a function of whether the PUCCH is periodic or aperiodic. For example, if an aperiodic PUCCH, the UE 110 may not need to listen for a CTS signal but the UE 110 may be required to listen for a CTS signal if the UE 110 desires to transmit a periodic PUCCH. Selection between the first and second examples may also be a function of the data type on a PUCCH. For example, a CQI may require the first example, but an ACK may require the second example.

In some examples, if the UE 110 listens for the CTS signal, the UE 110 may need time to process the CTS signal before transmitting the PUCCH. Accordingly, a gap between the CTS signal and the start of the PUCCH may be needed. Further, depending on the timeline the CTS signal and the PUCCH may be on different slots.

Conventional technologies only allow PUCCH slot aggregation with the same PUCCH start/end symbol on all aggregated slots. However, due to different types of slots, one PUCCH start symbol may be different than another PUCCH start symbol. Accordingly, the UE 110 may aggregate slots according to the following options.

Option 1: For the aggregated slots, the slots which have different PUCCH start symbols compared to a first slot (i.e., puncture) may be skipped.

Option 2: For the aggregated slots, the slots which have different PUCCH start symbols, compared to a first slot, are skipped, and aggregated slots are extended to additional slots (i.e., rate match).

Option 3: PUCCH aggregation is allowed with different PUCCH start symbols. The UE 110 may also receive an indication on whether to transmit a PUCCH on a given slot or not. For example, in slot 0, PUCCH format 1 may be used and the format 1 may span symbols 4-13 such that 5 UEs can be multiplexed on the same RB. While on slot 1, due to a CTS gap, the start symbol may become 6 and only allows multiplexing of 4 UEs. In this case, the base station 105 may indicate to the UE 110, or another one of the UEs, not to transmit on slot 1.

In some examples, the triggering signal (e.g., CTS, DCI, or SFI) may indicate a number of symbols (e.g., start symbol or number of symbols) available on different slots. Further, the UE 110 may be configured with multiple PUCCH formats (e.g., having different number of UL symbols). Once the UE 110 knows the number of UL symbols available on a slot (e.g., via CTS, DCI, or SFI) and it has a PUCCH configured (e.g., periodic PUCCH, aperiodic PUCCH triggered by grant) to be transmitted on the slot, the UE 110 may select a PUCCH format from configured formats and transmit the PUCCH according to the configured format. For example, the PUCCH format may have the same number of UL symbols as the number of available UL symbols for long PUCCH in the slot. In another example, the selected PUCCH format may have the largest number of UL symbols that is less than or equal to the number of available UL symbols for the long PUCCH in the slot. If the UE 110 is unable to select a format, the PUCCH transmission on that slot may be dropped.

According to the present disclosure, in some aspects, the long PUCCH parameters (e.g., start symbol, number of symbols, DMRS pattern, allowed power) may be different for different sets of slots. Further, an upper protocol layer configuration (e.g., RRC layer configuration) of the UE 110 may allow configuring the parameter sets for different sets of slots. Also, a slot format to be used in a slot may be determined partly through RRC configuration and partly through information sent in common and/or dedicated triggering signals (e.g., CTS, DCI, or SFI).

For dynamic TDD slots, in some aspects, PUCCH transmissions on dynamic slots may be enabled based on a triggering signal (e.g., CTS, DCI, or SFI). In some aspects, PUCCH transmission on dynamic slots may be dropped on detecting a DL CTS signal.

Figure 5:
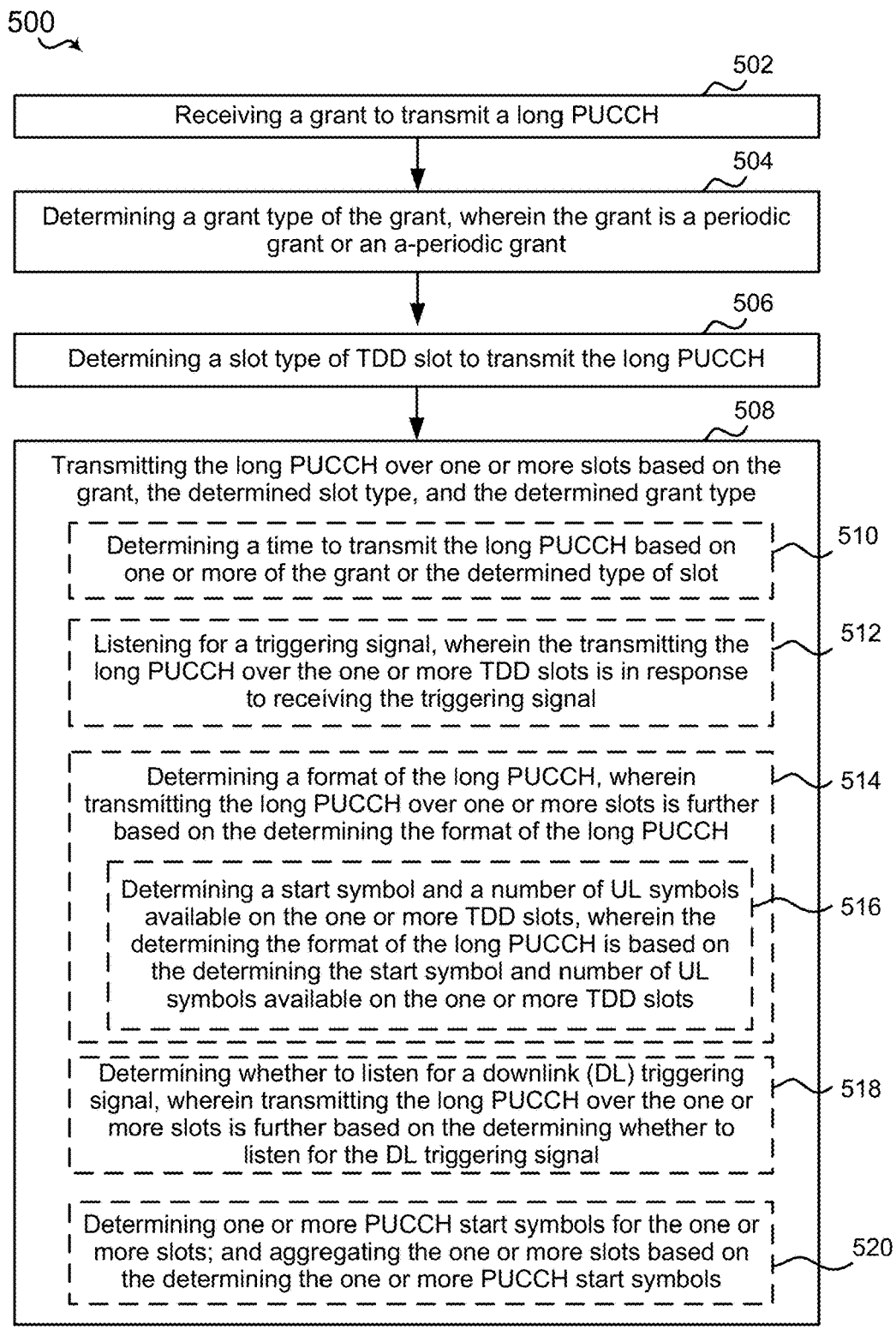
FIG. 5 is a flow diagram of an example of a method of handling long PUCCH transmissions on TDD slots.

Referring to FIG. 5, for example, a method 500 of wireless communication for operating the UE 110 according to the above-described aspects for dynamically controlling PUCCH transmissions includes one or more of the herein-defined actions. In an aspect, the method 500 may be performed by the UE 110 described by FIGS. 1 and 7 and one or more components or sub-components of the UE 110. For example, the method 500 may be performed by a processor 712, a transceiver 702, memory 716, the modem 140, the first PUCCH component 150, and/or any sub-component of the first PUCCH component 150 (e.g., the characteristic determining component 152).

At block 502, the method 500 may include receiving a grant to transmit a long PUCCH. For instance, in an aspect, the UE 110 may execute one or more of the processor 712, the modem 140, the first PUCCH component 150 and/or the characteristic determining component 152 (and/or transceiver 702, RF components as described in FIG. 7 below) to receive a grant to transmit a long PUCCH. In an example, the grant may be received by the UE 110 from the base station 105 over an upper protocol layer configuration (e.g., RRC layer configuration). In another example the grant may be received from a DCI signal (e.g., DL schedule 310, 440) in a current TDD slot or a previous TDD slot.

At block 504, the method 500 may include determining a grant type of the grant, wherein the grant type is one of a periodic grant or an aperiodic grant. For instance, in an aspect, the UE 110 may execute the first PUCCH component 150 and/or the characteristic determining component 152 to determine a grant type of the grant. In an example, the first PUCCH component 150 and/or the characteristic determining component 152 may be configured by an upper protocol layer configuration (e.g., RRC layer configuration) to treat all grants as periodic grants. In another example, the first PUCCH component 150 and/or the characteristic determining component 152 may be configured by an upper protocol layer configuration (e.g., RRC layer configuration) to treat a grant as periodic or aperiodic based on a triggering signal (e.g., CTS, DCI, or SFI).

At block 506, the method 500 may include determining a slot type of a TDD slot available to transmit the long PUCCH. For instance, in an aspect, the UE 110 may execute one or more of the processor 712, the modem 140, the first PUCCH component 150, and/or the characteristic determining component 152 to determine a type of slot to transmit on the PUCCH, as described herein. In an example, the type of slot may be one or more of a fixed slot or a flexible slot. In an example, the processor 712, the modem 140, the first PUCCH component 150, and/or the characteristic determining component 152 may have been configured via an upper protocol layer configuration (e.g., RRC layer configuration) or based on a triggering signal (e.g., CTS, DCI, or SFI) to determine whether the type of slot is a fixed slot or flexible slot. Further, the UE 110 may determine based on the upper protocol layer configuration (e.g., RRC layer configuration) or the triggering signal that a flexible DL slot can be converted to a flexible UL slot to transmit a long PUCCH over.

At block 508, the method 500 may include transmitting the long PUCCH over one or more TDD slots based on the grant, the determined slot type, and the determined grant type. For instance, in an aspect, the UE 110 may execute one or more of the processor 712, the modem 140, the first PUCCH component 150, and/or the characteristic determining component 152 (and/or transceiver 702, RF components as described in FIG. 7 below) to transmit the long PUCCH based on the determined slot type and the determined grant type, as described herein. For example, the processor 712, the modem 140, the first PUCCH component 150, and/or the characteristic determining component 152 (and/or transceiver 702, RF components may have been configured via an upper protocol layer configuration (e.g., RRC layer configuration) to always transmit a long PUCCH when the grant type is periodic and the slot type is a flexible UL slot. In another example, the processor 712, the modem 140, the first PUCCH component 150, and/or the characteristic determining component 152 (and/or transceiver 702, RF components may have been configured via the upper protocol layer configuration to transmit a long PUCCH based on a triggering signal (e.g., CTS, DCI, or SFI) that indicates that the grant type is aperiodic, and the slot type is a flexible UL slot.

In another aspect, the method 500 may optionally include, at block 510, determining a time to transmit the long PUCCH based on one or more of the grant or the determined slot type. For instance, in an aspect, the UE 110 may execute one or more of the processor 712, the modem 140, the first PUCCH component 150, and/or the characteristic determining component 152 to determine a time to transmit a long PUCCH based on one or more of the grant or the determined type of slot. For example, the processor 712, the modem 140, the first PUCCH component 150, and/or the characteristic determining component 152 may have been configured via the upper protocol layer configuration (e.g., RRC layer configuration) to transmit a long PUCCH only when a triggering signal (e.g., CTS, DCI, or SFI) indicates that the PUCCH may be transmitted.

In another aspect, the method 500 may optionally include, at block 512, listening for a triggering signal, wherein the transmitting the long PUCCH over the one or more TDD slots is in response to receiving the triggering signal. For example, one or more of the processor 712, the modem 140, the first PUCCH component 150, and/or the characteristic determining component 152 may have been configured via the upper protocol layer configuration to listen for a triggering signal (e.g., CTS, DCI, or SFI) indicating that the long PUCCH may be transmitted.

In another aspect, the method 500 may optionally include, at block 514, determining a format of the long PUCCH, wherein transmitting the long PUCCH over one or more slots is further based on the determining the format of the long PUCCH. For example, one or more of the processor 712, the modem 140, the first PUCCH component 150, and/or the characteristic determining component 152 may have been configured via the higher level configuration (e.g., RRC layer configuration) to determine a length, pattern, or start symbol of the long PUCCH based on the type of slot. In an example, one or more of the processor 712, the modem 140, the first PUCCH component 150, and/or the characteristic determining component 152 may be configured to adjust the long PUCCH according to fixed UL slots (e.g., structure 204) having a first number of symbols (e.g., 13 or more symbols) while flexible UL slots (e.g., structure 402) with triggering signal (e.g., CTS, DCI, or SFI) related gaps may have a different length (e.g., less than 8 symbols) as they have to have some symbols reserved for the triggering signal, and flexible UL slots without triggering signal related gaps may have yet another length (e.g., less than 13 symbols).

In another aspect, the method 500 may optionally include, at block 516, determining a start symbol and a number of UL symbols available on the one or more TDD slots, wherein the determining the format of the long PUCCH is based on determining that the start symbol and number of UL symbols available on the one or more TDD slots. For example, one or more of the processor 712, the modem 140, the first PUCCH component 150, and/or the characteristic determining component 152 may have been configured via an upper protocol layer configuration (e.g., RRC layer configuration) to determine a start symbol and a number of UL symbols available on the one or more TDD slots. In another example, the start symbol and the number of UL symbols may be received by one or more of the processor 712, the modem 140, the first PUCCH component 150, and/or the characteristic determining component 152 in a triggering signal (e.g., CTS, DCI, or SFI).

In another aspect, the method 500 may optionally include, at block 518, determining whether to listen for a DL triggering signal, wherein transmitting the PUCCH over the one or more slots is further based on the determining whether to listen for the DL triggering signal (e.g., CTS, DCI, or SFI). For example, one or more of the processor 712, the modem 140, the first PUCCH component 150, and/or the characteristic determining component 152 may have been configured via the upper protocol layer configuration to listen for a DL triggering signal (e.g., CTS, DCI, or SFI), wherein transmitting the PUCCH over the one or more slots is further based on the determining whether to listen for the DL triggering signal. In a first example, one or more of the processor 712, the modem 140, the first PUCCH component 150, and/or the characteristic determining component 152 may be configured to always listen to a triggering signal (e.g., CTS, DCI, or SFI) and not transmit the PUCCH if a triggering signal is received. In a second example, one or more of the processor 712, the modem 140, the first PUCCH component 150, and/or the characteristic determining component 152 may not be required to listen for a triggering signal (e.g., CTS, DCI, or SFI) but instead may be required to limit the length of the long PUCCH as compared to those PUCCHs where the UE 110 listened for the triggering signal.

Triggering Signal

In another aspect, the method 500 may optionally include, at block 520, determining one or more PUCCH start symbols for the one or more slots, and aggregating the one or more slots based on the determining the one or more PUCCH start symbols. For example, one or more of the processor 712, the modem 140, the first PUCCH component 150, and/or the characteristic determining component 152 may have been configured via an upper protocol layer configuration (e.g., RRC layer configuration) to determine one or more PUCCH start symbols for the one or more slots, and aggregate the one or more slots based on the determining the one or more PUCCH start symbols. For example, in aggregated slots, one or more of the processor 712, the modem 140, the first PUCCH component 150, and/or the characteristic determining component 152 may be configured to skip the slots which have different PUCCH start symbols compared to a first slot (i.e., puncture). In another example, for aggregated slots, one or more of the processor 712, the modem 140, the first PUCCH component 150, and/or the characteristic determining component 152 may be configured to skip slots which have different PUCCH start symbols compared to a first slot and extend aggregated slots to the additional slots (i.e., rate match). In yet another example, for aggregated slots, one or more of the processor 712, the modem 140, the first PUCCH component 150, and/or the characteristic determining component 152 may be configured to allow PUCCH aggregation with different PUCCH start symbols.

Figure 6:
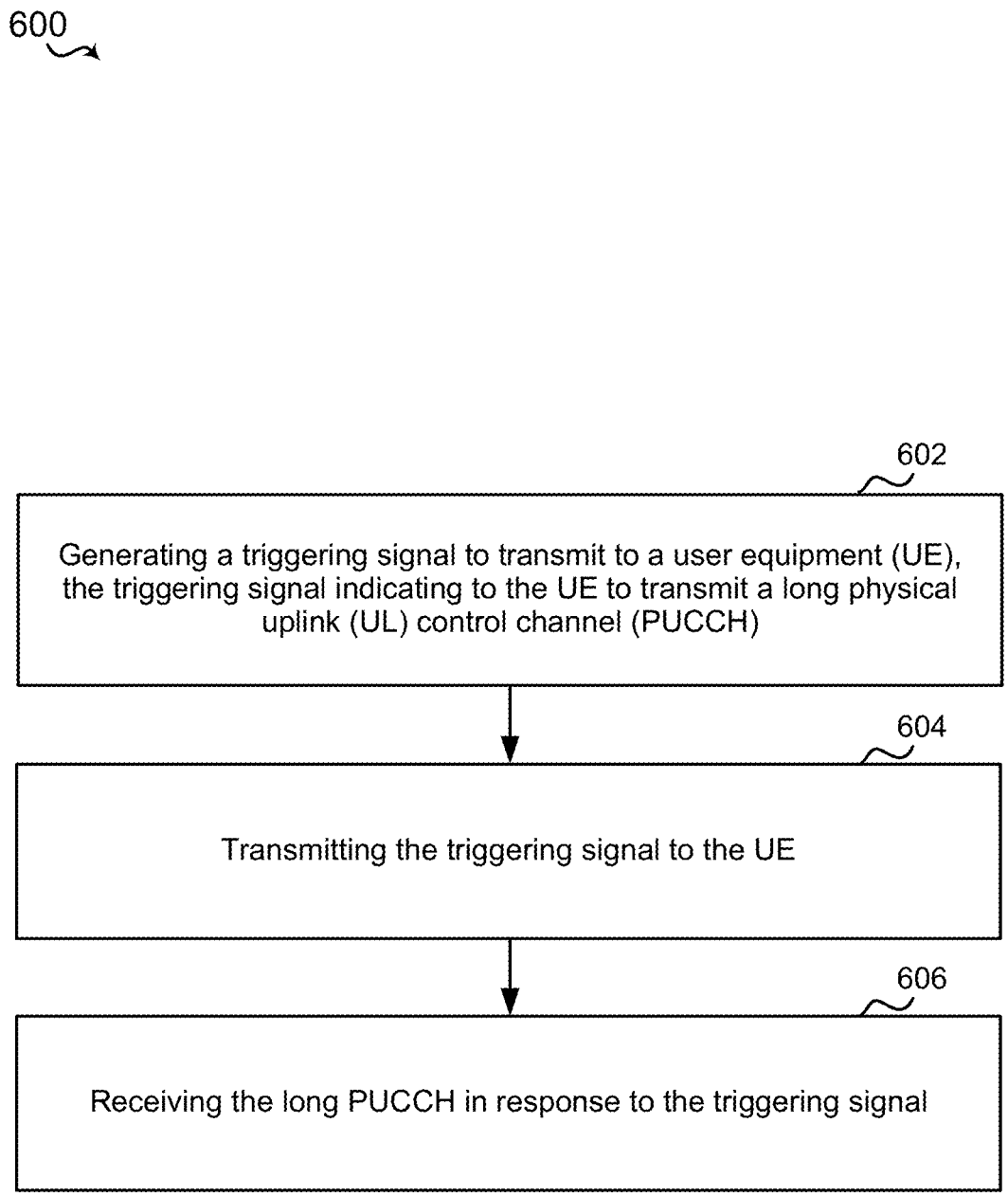
FIG. 6 is a flow diagram of an example of signaling of long PUCCH transmissions.

Referring to FIG. 6, for example, a method 600 of wireless communication by a base station according to the above-described aspects to signal the dynamic control for PUCCH transmission includes one or more of the herein-defined actions. In an aspect, the method 600 may be performed by the base station 105 described by FIGS. 1 and 8 and one or more components or sub-components of the UE 110. For example, the method 600 may be performed by a processor 812, a transceiver 802, a memory 816, the modem 160, the second PUCCH component 170, and/or any subcomponent of the second PUCCH component 170 (e.g., characteristic signaling component 172).

For example, at 602, the method 600 may include generating a triggering signal to transmit to a UE, the triggering signal indicating to the UE to transmit a long PUCCH. For instance, in an aspect, the base station 105 may execute one or more of the processor 812, the modem 160, the second PUCCH component 170, and/or the characteristic signaling component 172 to generate a triggering signal (e.g., CTS, DCI, or SFI), as described herein.

At 604, the method 600 may include transmitting the triggering signal to a UE. For instance, in an aspect, the base station 105 may execute one or more of the processor 812, the modem 160, the second PUCCH component 170, and/or characteristic signaling component 172 (and/or transceiver 802, RF components as described in FIG. 8 below) to transmit the triggering signal (e.g., CTS, DCI, or SFI), as described herein.

Figure 7:
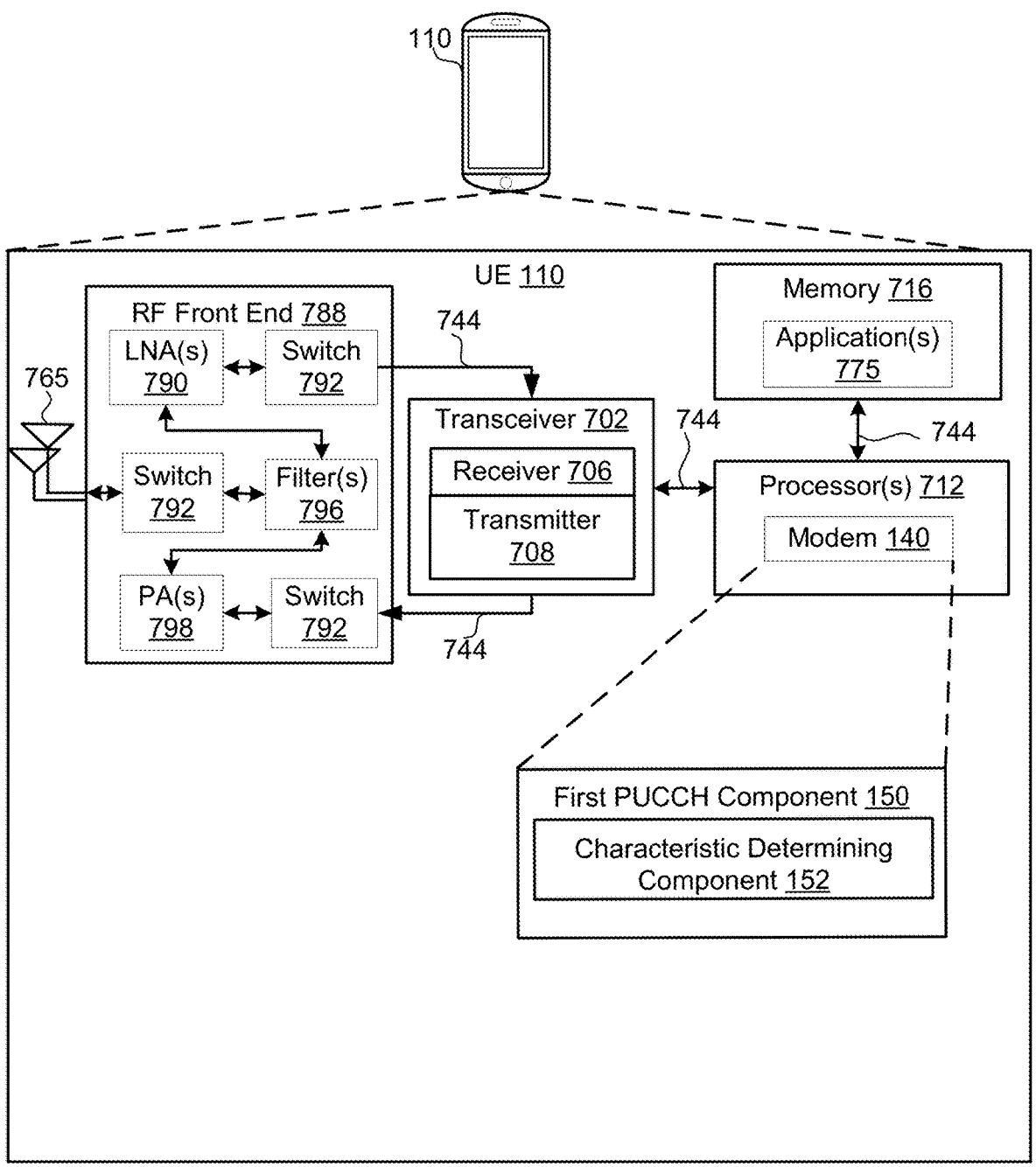
FIG. 7 is a schematic diagram of examples of components of the UE of FIG. 1.

Referring to FIG. 7, one example of an implementation of UE 110 may include a variety of components, some of which have already been described above, but including components such as one or more processors 712, memory 716, and transceiver 702 in communication via one or more buses 744, which may operate in conjunction with a modem 140 and the first PUCCH component 150 and/or characteristic determining component 152 to enable one or more of the functions described herein related to transmitting PUCCH in accordance with the dynamically controlling characteristics of PUCCH (e.g., method 500). The one or more processors 712, modem 140, memory 716, transceiver 702, RF front end 788 and one or more antennas 765, may be configured to support voice and/or data calls (simultaneously or non-simultaneously) in one or more radio access technologies.

In an aspect, the one or more processors 712 may include the modem 140 that uses one or more modem processors. The various functions related to the first PUCCH component 150 and/or the characteristic determining component 152 may be included in the modem 140 and/or the processors 712 and, in an aspect, may be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with the transceiver 702. In other aspects, some of the features of the one or more processors 712 and/or the modem 140 associated with the first PUCCH component 150 and/or the characteristic determining component 152 may be performed by the transceiver 702.

Also, the memory 716 may be configured to store data used herein and/or local versions of applications 775 or the first PUCCH component 150 and/or one or more of its subcomponents being executed by the at least one processors 712. The memory 716 may include any type of computer-readable medium usable by a computer or the at least one processor 712, such as random access memory (RAM), read only memory (ROM), tapes, magnetic discs, optical discs, volatile memory, non-volatile memory, and any combination thereof. In an aspect, for example, the memory 716 may be a non-transitory computer-readable storage medium that stores one or more computer-executable codes defining the first PUCCH component 150 and/or one or more of its subcomponents, and/or data associated therewith, when the UE 110 is operating the at least one processor 712 to execute the first PUCCH component 150 and/or one or more of its subcomponents.

The transceiver 702 may include at least one receiver 706 and at least one transmitter 708. The receiver 706 may include hardware, firmware, and/or software code executable by a processor for receiving data, the code comprising instructions and being stored in a memory (e.g., computer-readable medium). The receiver 706 may be, for example, a radio frequency (RF) receiver. In an aspect, the receiver 706 may receive signals transmitted by at least one of the base stations 105. Additionally, the receiver 706 may process such received signals, and also may obtain measurements of the signals, such as, but not limited to, Ec/Io, SNR, RSRP, RSSI, etc. The transmitter 708 may include hardware, firmware, and/or software code executable by a processor for transmitting data, the code comprising instructions and being stored in a memory (e.g., computer-readable medium). A suitable example of the transmitter 708 may include, but is not limited to, an RF transmitter. The transceiver 702, receiver 706, and/or transmitter 708 may be configured to operate in mmW frequencies and/or near mmW frequencies.

Moreover, in an aspect, the UE 110 may include the RF front end 788, which may operate in communication with one or more antennas 765 and the transceiver 702 for receiving and transmitting radio transmissions, for example, wireless communications transmitted by at least one of the base stations 105 or wireless transmissions transmitted by the UE 110. The RF front end 788 may be connected to the one or more antennas 765 and may include one or more low-noise amplifiers (LNAs) 790, one or more switches 792, one or more power amplifiers (PAs) 798, and one or more filters 796 for transmitting and receiving RF signals.

In an aspect, the LNA 790 may amplify a received signal at a desired output level. In an aspect, each of the LNAs 790 may have a specified minimum and maximum gain values. In an aspect, the RF front end 788 may use the one or more switches 792 to select a particular LNA 790 and its specified gain value based on a desired gain value for a particular application.

The one or more PA(s) 798 may be used by the RF front end 788 to amplify a signal for an RF output at a desired output power level. In an aspect, each of the PAs 798 may have specified minimum and maximum gain values. In an aspect, the RF front end 788 may use the one or more switches 792 to select a particular PA 798 and its specified gain value based on a desired gain value for a particular application.

Also, for example, the one or more filters 796 may be used by the RF front end 788 to filter a received signal to obtain an input RF signal. Similarly, in an aspect, for example, a respective filter 796 may be used to filter an output from a respective PA 798 to produce an output signal for transmission. In an aspect, each of the filters 796 may be connected to a specific LNA 790 and/or PA 798. In an aspect, the RF front end 788 may use the one or more switches 792 to select a transmit or receive path using a specified filter 796, LNA 790, and/or PA 798, based on a configuration as specified by the transceiver 702 and/or processor 712.

As such, the transceiver 702 may be configured to transmit and receive wireless signals through the one or more antennas 765 via the RF front end 788. In an aspect, the transceiver 702 may be tuned to operate at specified frequencies such that the UE 110 may communicate with, for example, one or more of the base stations 105 or one or more cells associated with one or more of the base stations 105. In an aspect, for example, the modem 140 may configure the transceiver 702 to operate at a specified frequency and power level based on the UE configuration of the UE 110 and the communication protocol used by the modem 140.

In an aspect, the modem 140 may be a multiband-multimode modem, which may process digital data and communicate with the transceiver 702 such that the digital data is sent and received using the transceiver 702. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 788, transceiver 702) to enable transmission and/or reception of signals from the network based on a specified modem configuration. In an aspect, the modem configuration may be based on the mode of the modem 140 and the frequency band in use. In another aspect, the modem configuration may be based on UE configuration information associated with the UE 110 as provided by the network during cell selection and/or cell reselection.

Figure 8:
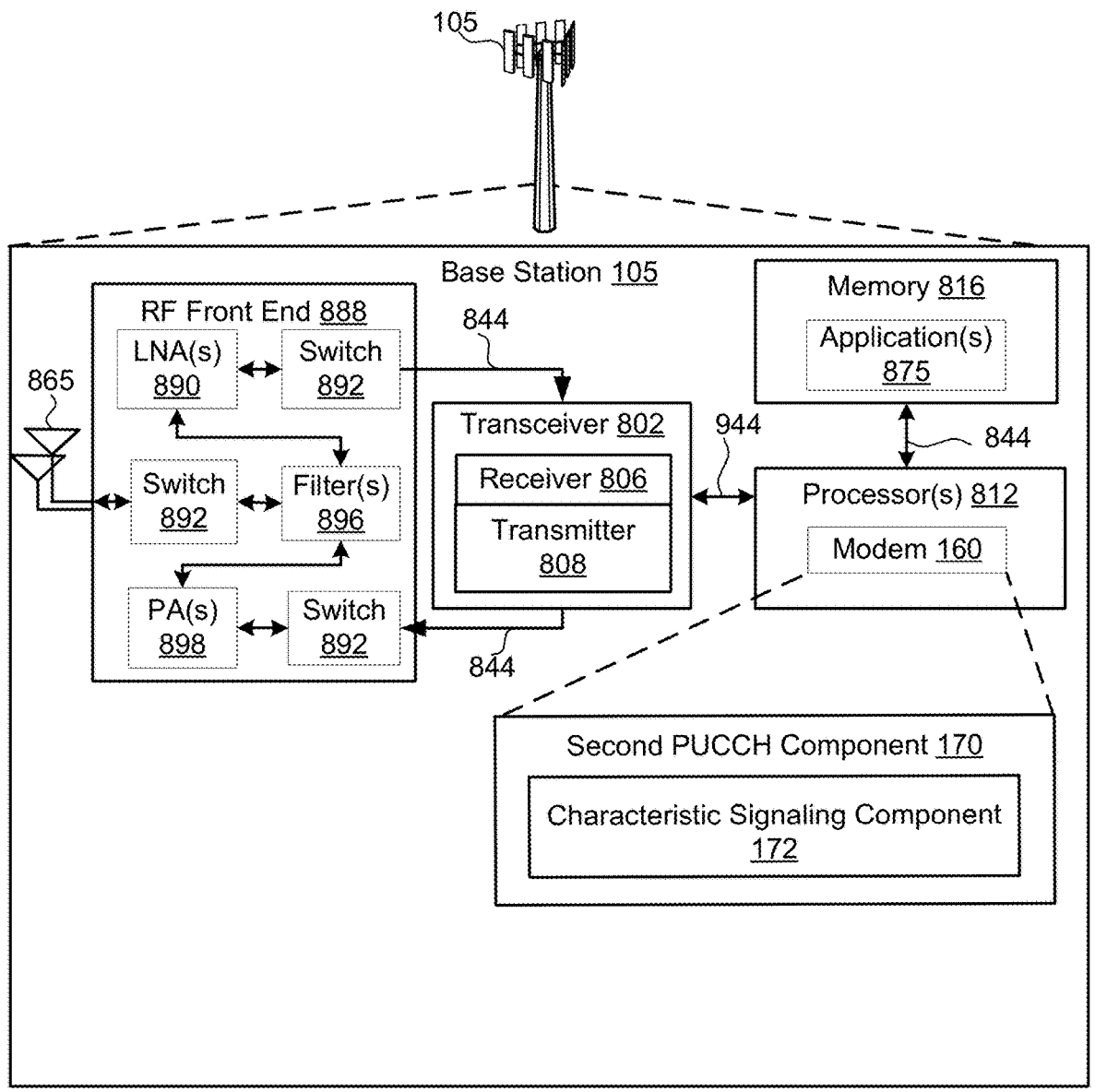
FIG. 8 is a schematic diagram of examples of components of the base station of FIG. 1.

Referring to FIG. 8, one example of an implementation of base station 105 may include a variety of components, some of which have already been described above, but including components such as one or more processors 812, memory 816 and transceiver 802 in communication via one or more buses 844, which may operate in conjunction with modem 160 and the second PUCCH component 170 and/or characteristic signaling component 172 to enable one or more of the functions described herein related to dynamically controlling signaling for PUCCH transmission by a UE (e.g., method 600).

The transceiver 802, receiver 806, transmitter 808, one or more processors 812, memory 816, applications 875, buses 844, RF front end 888, LNAs 890, switches 892, filters 896, PAs 898, and one or more antennas 865 may be the same as or similar to the corresponding components of the UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications by a user equipment (UE), comprising:
   receiving a grant to transmit a long physical uplink (UL) control channel (PUCCH);
   determining a grant type of the grant, wherein the grant type is one of a periodic grant or an aperiodic grant;
   determining a slot type of a time division duplexing (TDD) slot available to transmit the long PUCCH; and
   transmitting the long PUCCH over one or more TDD slots based on the grant, the determined slot type, and the determined grant type.

2. The method of claim 1, wherein the grant is received from a base station over an upper protocol layer configuration or from a downlink (DL) control information (DCI) signal in a current TDD slot or a previous TDD slot.

3. The method of claim 1, wherein the determined slot type is one or more of a fixed UL slot, a fixed downlink (DL) slot, or a flexible slot.

4. The method of claim 1, wherein the determined slot type is determined from a common downlink (DL) control information (DCI) in a current TDD slot or a previous TDD slot.

5. The method of claim 1, further comprising:
   determining a time to transmit the long PUCCH based on one or more of the grant or the determined slot type.

6. The method of claim 1, further comprising:
   listening for a triggering signal,
   wherein the transmitting of the long PUCCH over the one or more TDD slots is in response to receiving the triggering signal.

7. The method of claim 6, wherein the triggering signal is one of a slot format information (SFI) signal, a downlink (DL) control information (DCI) signal, or a clear to send (CTS) signal.

8. The method of claim 7, wherein the triggering signal is selected from an upper protocol layer configuration set of choices based on one or more of content of the long PUCCH or the determined grant type.

9. The method of claim 1, further comprising:
   determining a format of the long PUCCH,
   wherein the transmitting of the long PUCCH over the one or more TDD slots is further based on the determining of the format of the long PUCCH.

10. The method of claim 9, further comprising:
    determining a start symbol and a number of UL symbols available on the one or more TDD slots,
    wherein the determining of the format of the long PUCCH is based on the determining of the start symbol and the number of UL symbols available on the one or more TDD slots.

11. The method of claim 10, wherein the determining of the start symbol and the number of UL symbols is based on whether the UE is configured to listen for a clear to send (CTS) signal or explicitly configured for the start symbol.

12. The method of claim 11, wherein the UE is configured to listen for the CTS signal or explicitly configured for the start symbol based one of downlink (DL) control information (DCI) signal or based on an upper protocol layer configuration.

13. The method of claim 1, further comprising:
    obtaining a parameter of the long PUCCH from a downlink (DL) control information (DCI) signal or an acknowledgment/negative-acknowledgment (ACK/NACK) resource indicator (ARI) field of the grant.

14. The method of claim 13, wherein the parameter of the long PUCCH includes one or more of a start symbol, a number of symbols, a demodulation reference signal (DMRS) pattern, or a transmission power.

15. The method of claim 1, further comprising:
    determining whether to listen for a downlink (DL) clear to send (CTS) signal from a neighboring UE,
    wherein transmitting the long PUCCH over the one or more TDD slots is further based on the determining whether to listen for the DL CTS signal.

16. The method of claim 15, wherein determining whether to listen for the DL CTS signal is based on one or more of the determined slot type, the determined grant type, an upper protocol layer configuration, a downlink (DL) control information (DCI) signal, or content of the PUCCH.

17. The method of claim 1, further comprising:
    determining one or more start symbols for the one or more TDD slots; and
    aggregating the one or more TDD slots based on the determining the one or more start symbols.

18. The method of claim 17, further comprising:
    transmitting the long PUCCH in the aggregated one or more TDD slots based on the determined slot type and the one or more start symbols.

19. The method of claim 17, wherein a format of the long PUCCH used in each of the one or more TDD slots is based on the one or more start symbols and a number of symbols in each slot.

20. The method of claim 1, wherein the one or more TDD slots includes a self-contained uplink-centric slot.

21. The method of claim 1, wherein the one or more TDD slots includes a non-self-contained UL slot.

22. A method of wireless communications by a base station, comprising:
    transmitting, to a user equipment (UE), a grant for the UE to transmit a long physical uplink (UL) control channel (PUCCH);
    generating a triggering signal to transmit the UE, the triggering signal indicating to the UE to transmit the PUCCH;
    transmitting the triggering signal to the UE; and
    receiving the long PUCCH from the UE in response to the triggering signal, wherein the long PUCCH is received over one or more time division duplexing (TDD) slots determined by the UE based on the grant.

23. A user equipment (UE), comprising:
    a memory; and
    a processor in communication with the memory, and configured to:
    receive a grant to transmit a long physical uplink (UL) control channel (PUCCH);
    determine a grant type of the grant, wherein the grant type is one of a periodic grant or an aperiodic grant;
    determine a slot type of a time division duplexing (TDD) slot available to transmit the long PUCCH; and
    transmit the long PUCCH over one or more TDD slots based on the grant, the determined slot type, and the determined grant type.

24. The UE of claim 23, wherein the grant is received from a base station over an upper protocol layer configuration or from a downlink (DL) control information (DCI) signal in a current TDD slot or a previous TDD slot.

25. The UE of claim 23, wherein the determined slot type is one or more of a fixed UL slot, a fixed downlink (DL) slot, or a flexible slot.

26. The UE of claim 23, wherein the determined slot type is determined from a common downlink (DL) control information (DCI) in a current TDD slot or a previous TDD slot.

27. The UE of claim 23, wherein the processor is further configured to:
   determine a time to transmit the long PUCCH based on one or more of the grant or the determined slot type.

28. The UE of claim 23, wherein the processor is further configured to:
   listen for a triggering signal,
   wherein the long PUCCH is transmitted over the one or more TDD slots in response to receiving the triggering signal.

29. The UE of claim 28, wherein the triggering signal is one of a slot format information (SFI) signal, a downlink (DL) control information (DCI) signal, or a clear to send (CTS) signal.

30. A base station, comprising:
   a memory; and
   a processor in communication with the memory, and configured to:
   transmit, to a user equipment (UE), a grant for the UE to transmit a long physical uplink (UL) control channel (PUCCH);
   generate a triggering signal to transmit to the UE, the triggering signal indicating to the UE to transmit the PUCCH;
   transmit the triggering signal to the UE; and
   receive the long PUCCH from the UE in response to the triggering signal, wherein the long PUCCH is received over one or more time division duplexing (TDD) slots determined by the UE based on the grant.

* * * * *